Patented Dec. 5, 1922.

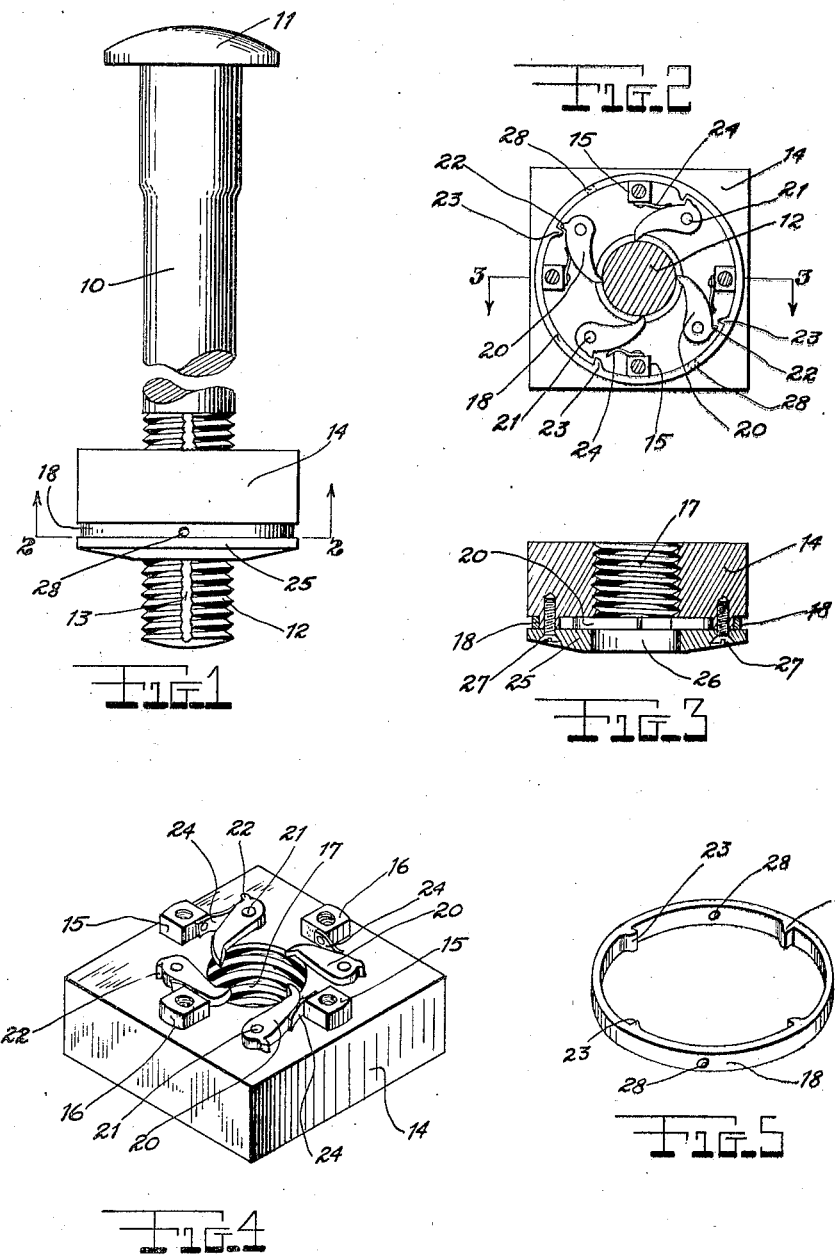

1,437,871

UNITED STATES PATENT OFFICE.

FRANCISZEK SZYMANSKI, ANDREW DUDEK, AND PIOTR DUDEK, OF ELLSWORTH, PENNSYLVANIA.

RAIL BOLT.

Application filed October 25, 1921. Serial No. 510,296.

*To all whom it may concern:*

Be it known that we, FRANCISZEK SZYMANSKI, a citizen of Poland, ANDREW DUDEK, a citizen of the United States, and PIOTR DUDEK, a citizen of Poland, residing at Ellsworth, in the county of Washington and State of Pennsylvania, have invented certain new and useful Improvements in Rail Bolts, of which the following is a specification.

One of the objects of this invention is to provide a bolt such as is generally used in construction, railway and mechanical work, with means by which a nut may be engaged in a manner that will prevent it from being released or removed by vibration or torsional strain.

Another object is the provision of means by which a nut, mechanically secured to a co-acting bolt, may be removed or tightened by manipulating a securing element rotatably engaged with the nut.

These and other like objects are attained by the novel construction and arrangement of parts hereinafter described and shown in the accompanying drawing, forming a material part of this disclosure, and in which:—

Figure 1 is a side view of a bolt and lock nut made in accordance with the invention.

Figure 2 is a partial sectional view of the same taken on the line 2—2 of Figure 1.

Figure 3 is a sectional view of the nut, taken on the line 3—3 of Figure 2.

Figure 4 is a perspective view of the nut showing the locking pawls and releasing ring guides.

Figure 5 is a perspective view of the locking pawl releasing ring.

Referring to the figures in detail, the numeral 10 designates the body of a bolt, having a button head 11 and a screw threaded portion 12 in which are formed a plurality of longitudinal, spaced slots 13.

A nut 14, adapted to engage the threaded bolt element 12, is provided with a plurality of raised blocks 15, their outer edges 16 being arcuately curved and concentric with the tapped hole 17, thus forming guide elements about which the locking pawl releasing ring 18, is rotatably positioned.

Between the blocks 15 a plurality of hook ended locking pawls 20 are pivotally mounted on the face of the nut 14, by pivot pins 21 fixed in the nut. At the pivoted end of the locking pawls 10, and radial with the pivotal center are integral extensions 22, adapted to abut the projecting lugs 23 of the releasing ring 18.

Springs 24, secured to the inner side of the blocks 15, impinge against the locking pawls 20, causing their hooked ends to drop into engagement with the slots 13 of the bolt section 12.

Reference to the Figure 2 discloses clearly the relative position of parts when the locking pawls are in locked engagement with the slots of the bolt.

The ring 18 on being rotated in clock-wise direction, causes engagement between the lugs 23 and pawl extensions 22, and further rotation forces the locking pawls out of engagement with the slots 13, thus permitting the nut to be removed from the bolt.

A keeper plate 25, having a central annular opening 26, through which the bolt freely passes, is secured to the nut face by the screws 27 engaging the nut through the blocks 15.

Openings 28 are provided through the wall of the ring for the introduction of a wire or spanner wrench for effecting rotation.

The foregoing disclosure is to be regarded as descriptive and illustrative only, and not as restrictive or limitative of the invention, of which obviously an embodiment may be constructed including many modifications without departing from the general scope herein indicated and denoted in the appended claim.

Having thus described our invention, what we claim as new and desire to secure by Letters Patent, is:

A lock comprising, in combination with a screw-threaded element having slots formed transversely of the threads, a polygonal body internally threaded to suit said element, raised blocks on one side of said body, said blocks having curved outer surfaces concentric to the opening in said body, spring actuated pawls pivoted on said body, between said blocks, the points of said pawls being adapted to engage in the slots of said element, outwardly extending lugs on said pawls, a ring rotatably circumjacent said blocks, cam lugs on the interior of said ring adapted to contact with the lugs of said pawls to release the same upon rotation of said ring, and an apertured cover plate secured to overlie said ring and pawls.

In witness whereof we affix our signatures.

FRANCISZEK SZYMANSKI.
ANDREW DUDEK.
PIOTR DUDEK.